(12) United States Patent
Toyota et al.

(10) Patent No.: US 12,455,500 B2
(45) Date of Patent: *Oct. 28, 2025

(54) WHITEBOARD FILM, WHITEBOARD, PEEP PREVENTION SYSTEM

(71) Applicant: NITTO DENKO CORPORATION, Ibaraki (JP)

(72) Inventors: Yuji Toyota, Ibaraki (JP); Masahiro Yaegashi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 432 days.

This patent is subject to a terminal disclaimer.

(21) Appl. No.: 17/915,526

(22) PCT Filed: Oct. 14, 2021

(86) PCT No.: PCT/JP2021/038133
§ 371 (c)(1),
(2) Date: Sep. 29, 2022

(87) PCT Pub. No.: WO2022/091806
PCT Pub. Date: May 5, 2022

(65) Prior Publication Data
US 2023/0123755 A1    Apr. 20, 2023

(30) Foreign Application Priority Data

Oct. 29, 2020    (JP) .................................. 2020-181420

(51) Int. Cl.
*G03B 21/604*      (2014.01)
*B43L 1/00*        (2006.01)
(Continued)

(52) U.S. Cl.
CPC .............. *G03B 21/604* (2013.01); *B43L 1/00* (2013.01); *G02B 5/3033* (2013.01); *G02B 5/0284* (2013.01)

(58) Field of Classification Search
CPC ...... G03B 21/604; G03B 21/56; G03B 21/60; B43L 1/00; G02B 5/3033; G02B 5/30; (Continued)

(56) References Cited

U.S. PATENT DOCUMENTS

| 10,061,138 B2 | 8/2018 | Mead et al. |
| 2002/0015120 A1 | 2/2002 | Kameyama et al. |

(Continued)

FOREIGN PATENT DOCUMENTS

| JP | H107-270916 A | 10/1995 |
| JP | H09-230506 A | 9/1997 |

(Continued)

OTHER PUBLICATIONS

WO 2019/202988 to Yaegashi, published Oct. 24, 2019, English language machine translation generated Apr. 22, 2025 (Year: 2019).*

(Continued)

*Primary Examiner* — Derek S. Chapel
*Assistant Examiner* — Adam W Booher
(74) *Attorney, Agent, or Firm* — WHDA, LLP

(57) ABSTRACT

A whiteboard film (100) according to an embodiment of the present invention includes: a diffuse reflection layer (40) to diffuse-reflect visible light; an absorptive polarizing layer (20) having a first transmission axis that is parallel to a first direction; and a reflective polarizing layer (10) being disposed between the diffuse reflection layer (40) and the absorptive polarizing layer (20) and having a second transmission axis that is substantially parallel to the first direction. A whiteboard (100*a*) according to an embodiment of the present invention includes: a diffuse reflection plate (40*a*) to diffuse-reflect visible light; an absorptive polarizing layer (20) having a first transmission axis that is parallel to a first direction; and a reflective polarizing layer (10) being disposed between the diffuse reflection plate (40*a*) and the (Continued)

absorptive polarizing layer (20) and having a second transmission axis that is substantially parallel to the first direction.

10 Claims, 3 Drawing Sheets

(51) Int. Cl.
  *G02B 5/02* (2006.01)
  *G02B 5/30* (2006.01)
(58) Field of Classification Search
  CPC .... G02B 5/3025; G02B 5/3041; G02B 5/305; G02B 5/02; G02B 5/0205; G02B 5/021–0242; G02B 5/0284
  See application file for complete search history.

(56) References Cited

U.S. PATENT DOCUMENTS

| | | | |
|---|---|---|---|
| 2007/0159577 A1* | 7/2007 | Atsushi | G02B 5/3058 349/96 |
| 2010/0045902 A1 | 2/2010 | Ikeda et al. | |
| 2013/0265506 A1 | 10/2013 | Nishimura et al. | |
| 2015/0247962 A1 | 9/2015 | Mead et al. | |
| 2015/0277012 A1 | 10/2015 | Nakamura et al. | |
| 2016/0274450 A1* | 9/2016 | Usukura | G03B 21/604 |
| 2017/0052288 A1 | 2/2017 | Ludemann et al. | |
| 2021/0141300 A1 | 5/2021 | Yaegashi | |
| 2023/0311559 A1* | 10/2023 | Yamamoto | B43L 1/10 434/425 |
| 2023/0333420 A1* | 10/2023 | Toyota | G02B 5/3025 |

FOREIGN PATENT DOCUMENTS

| | | |
|---|---|---|
| JP | H10-268427 A | 10/1998 |
| JP | 2000-227518 A | 8/2000 |
| JP | 2006-051792 A | 2/2006 |
| JP | 2012-088692 A | 5/2012 |
| JP | 2015-200866 A | 11/2015 |
| JP | 2017-515153 A | 6/2017 |
| WO | 2008/078618 A1 | 7/2008 |
| WO | 2009/066515 A1 | 5/2009 |
| WO | 2018-225741 A1 | 12/2018 |
| WO | 2019/202988 A1 | 10/2019 |

OTHER PUBLICATIONS

Office Action dated Oct. 17, 2023, issued in counterpart JP Application No. 2022-559004, with English translation. (10 pages).
Written Opinion dated Dec. 28, 2021, issued in counterpart Application No. PCT/JP2021/038133, with English Translation. (8 pages).
International Search Report dated Dec. 28, 2021, issued in counterpart International Application PCT/JP2021/038133.

* cited by examiner

WHITEBOARD FILM, WHITEBOARD, PEEP PREVENTION SYSTEM

TECHNICAL FIELD

The present invention relates to a whiteboard film, a whiteboard, and a peeking prevention system.

BACKGROUND ART

The use of open conference rooms that provide a sense of spatial openness is becoming more widespread. For example, the walls (or partitions) of a conference room may be made of glass panels (or acrylic panels) to provide a sense of openness because of their transparency. Oftentimes a whiteboard or a projector screen is installed in a conference room for presentation purposes, for example. While transparency of the walls of the conference room provides a sense of openness, it can be a problem if an outside stranger peeks at the information that is being displayed on a whiteboard or a projector screen in the conference room. Whiteboard films, for use as both a whiteboard and a projector screen, are also known.

Patent Document 1 discloses a peeking prevention system that includes a space, an information screen disposed in the space, and a window to delimit the space from the surroundings. The "information screen" displays information by reflecting and/or emitting polarized light that is parallel to a first direction, thereby presenting the displayed information within the space. As an example of the information screen, an information screen that includes a whiteboard and a polarizer attached onto the surface of the whiteboard is described. The window includes a transparent substrate and a polarizer that absorbs light polarized in parallel to the first direction. While allowing the inside of the space to be seen through the transparent window from outside of the space, the information displayed on the information screen can be made invisible.

CITATION LIST

Patent Literature

[Patent Document 1] the specification of U.S. Pat. No. 10,061,138

SUMMARY OF INVENTION

Technical Problem

According to a study by the inventors, information which is displayed on the information screen described in Patent Document 1 (specifically an information screen that includes a whiteboard and a polarizer; the same applies hereinafter) may not have sufficient visibility when observed from inside of the space. Specifically, when the information screen described in Patent Document 1 is used as a whiteboard, i.e., when text characters, symbols, drawings, etc., are drawn on the surface of the information screen described in Patent Document 1 with an ink containing a pigment or a dyestuff, the text characters, symbols, drawings, etc., having been drawn may not have sufficient visibility when observed from inside of the space.

The problem associated with the information screen described in Patent Document 1, that is, the displayed information not having sufficient visibility, may also be present when the information screen described in Patent Document 1 is used as a projector screen. When an image is projected by a projector onto the information screen described in Patent Document 1, the projected image may not have sufficient visibility when observed from inside of the space (for example, the projected image may not have a sufficient contrast ratio).

The present invention has been made in view of the above problem, and an objective thereof is to provide a whiteboard film and whiteboard that allows the visibility of displayed information to be improved, as well as a peeking prevention system that includes such a whiteboard film or whiteboard. As used herein, a "whiteboard film (or whiteboard) that allows the visibility of displayed information to be improved" means a whiteboard film (or whiteboard) that provides at least one of: (1) the effect of allowing for improving the visibility of text characters, symbols, drawings, etc., drawn on the surface of a whiteboard film (or whiteboard) with an ink containing a pigment or a dyestuff; or (2) the effect of allowing for improving the visibility of an image projected by a projector onto a whiteboard film (or whiteboard).

Solution to Problem

According to embodiments of the present invention, means for solution as recited in the following Items are provided.

[Item 1]
A whiteboard film comprising:
a diffuse reflection layer to diffuse-reflect visible light;
an absorptive polarizing layer having a first transmission axis that is parallel to a first direction; and
a reflective polarizing layer being disposed between the diffuse reflection layer and the absorptive polarizing layer and having a second transmission axis that is substantially parallel to the first direction.

[Item 2]
The whiteboard film of Item 1, further comprising a low-refractive index layer being disposed between the diffuse reflection layer and the reflective polarizing layer and having a refractive index that is smaller than a refractive index of the diffuse reflection layer.

[Item 3]
The whiteboard film of Item 2, wherein the refractive index of the low-refractive index layer is 1.30 or less.

[Item 4]
The whiteboard film of Item 2 or 3, wherein the low-refractive index layer is an air layer.

[Item 5]
The whiteboard film of Item 2 or 3, wherein the low-refractive index layer is a porous layer.

[Item 6]
A whiteboard comprising:
a diffuse reflection plate to diffuse-reflect visible light;
an absorptive polarizing layer having a first transmission axis that is parallel to a first direction; and
a reflective polarizing layer being disposed between the diffuse reflection plate and the absorptive polarizing layer and having a second transmission axis that is substantially parallel to the first direction.

[Item 7]
The whiteboard of Item 6, further comprising a low-refractive index layer being disposed between the diffuse reflection plate and the reflective polarizing layer and having a refractive index that is smaller than a refractive index of the diffuse reflection plate.

[Item 8]

The whiteboard of Item 7, wherein the refractive index of the low-refractive index layer is 1.30 or less.

[Item 9]

The whiteboard of Item 7 or 8, wherein the low-refractive index layer is an air layer.

[Item 10]

The whiteboard of Item 7 or 8, wherein the low-refractive index layer is a porous layer.

[Item 11]

A peeking prevention system comprising:
the whiteboard film of any one of Items 1 to 5 or the whiteboard of any one of Items 6 to 10; and
a partition to delimit from the surroundings a space in which information displayed on the whiteboard film or the whiteboard is presented, the partition having a light-transmitting portion through which the inside of the space is viewable, wherein
the light-transmitting portion includes a transparent substrate and a polarizing layer, the polarizing layer having a third transmission axis that is orthogonal to the first direction.

Advantageous Effects of Invention

According to the present invention embodiment, there is provided a whiteboard film and whiteboard that allows the visibility of displayed information to be improved, as well as a peeking prevention system that includes such a whiteboard film or whiteboard.

DESCRIPTION OF EMBODIMENTS

Figure 1A:
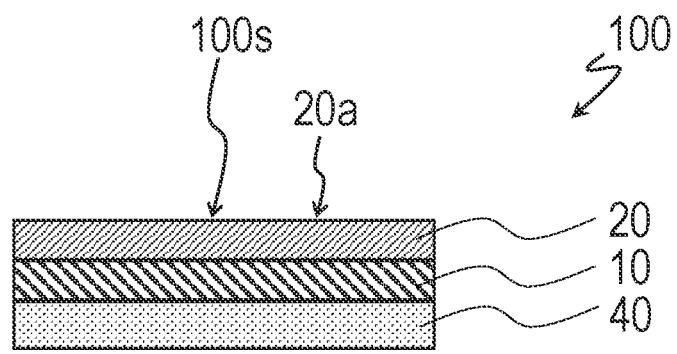
FIG. 1A A schematic cross-sectional view of a whiteboard film 100 according to an embodiment of the present invention.

Hereinafter, a whiteboard film, a whiteboard, and a peeking prevention system according to an embodiment of the present invention will be described. Embodiments the present invention are not limited to what will be illustrated hereinbelow.

A. Whiteboard Film, Whiteboard, and Peeking Prevention System

A whiteboard film according to an embodiment of the present invention may be attached onto a base, so as to constitute a whiteboard. The method for attaching the whiteboard film onto the base is not particularly limited; for example, it may be bonded by using an adhesive, or attached by using a magnet. An "adhesive" is inclusive of a tackiness agent (also called "pressure-sensitive adhesive"). The whiteboard film may be fixed on, or removably attached to, the base.

A whiteboard film according to an embodiment of the present invention includes: a diffuse reflection layer to diffuse-reflect visible light; an absorptive polarizing layer having a transmission axis (first transmission axis) that is parallel to a first direction; and a reflective polarizing layer being disposed between the diffuse reflection layer and the absorptive polarizing layer and having a transmission axis (second transmission axis) that is substantially parallel to the first direction. The reflective polarizing layer transmits polarized light that is parallel to its transmission axis, and reflects polarized light that is orthogonal to its transmission axis. When it is said that the transmission axis of the absorptive polarizing layer is substantially parallel to the transmission axis of the reflective polarizing layer, this is meant to encompass the case where the angle made by the transmission axis of the absorptive polarizing layer and the transmission axis of the reflective polarizing layer has a margin of error within ±5° of 0°. The diffuse reflection layer has a diffuse reflectance of preferably 80% or more, and more preferably 90% or more, for example. A specular reflection component in the total reflected light when visible light is incident on the diffuse reflection layer is preferably 50% or less (that is, there is a diffuse reflection component of 50% or more), for example.

A whiteboard according to an embodiment of the present invention differs from a whiteboard film according to an embodiment of the present invention in that the whiteboard includes a diffuse reflection plate, instead of a diffuse reflection layer, to diffuse-reflect visible light. A "diffuse reflection plate" refers to that which requires no supporting base, whereas a "diffuse reflection layer" refers to that which is commonly used in a state of being supported on a base, or that which cannot exist without a supporting base. A diffuse reflection layer and a base supporting the diffuse reflection layer may together be referred to as a diffuse reflection plate. The diffuse reflection layer and the base may monolithically (i.e., without a clear boundary existing between the diffuse reflection layer and the base) compose the diffuse reflection plate. However, this is not to exclude implementations where a diffuse reflection plate is being supported on a base. A whiteboard according to an embodiment of the present invention can be used without being supported on a base. Unless otherwise specified, any description concerning a whiteboard film according to an embodiment of the present invention in the present specification also applies to a whiteboard according to an embodiment of the present invention.

A peeking prevention system according to an embodiment of the present invention includes: the aforementioned whiteboard film or whiteboard; and a partition to delimit from the surroundings a space in which information displayed on the whiteboard film or whiteboard is presented, the partition having a light-transmitting portion through which the inside of the space is viewable. The light-transmitting portion includes: a transparent substrate; and a polarizing layer having a transmission axis (third transmission axis) that is orthogonal to the first direction.

FIG. 1A shows a schematic cross-sectional view of a whiteboard film 100 according to an embodiment of the present invention. The whiteboard film 100 includes a diffuse reflection layer 40 to diffuse-reflect visible light; an absorptive polarizing layer 20; and a reflective polarizing layer 10 disposed between the diffuse reflection layer 40 and the absorptive polarizing layer 20. The first transmission axis of the absorptive polarizing layer 20 and the second transmission axis of the reflective polarizing layer 10 are disposed so as to be substantially parallel. By including the reflective polarizing layer 10 between the diffuse reflection layer 40 and the absorptive polarizing layer 20, the whiteboard film 100 provides an improved efficiency of light utilization. The whiteboard film 100 allows the visibility of displayed information to be improved.

Figure 1B:
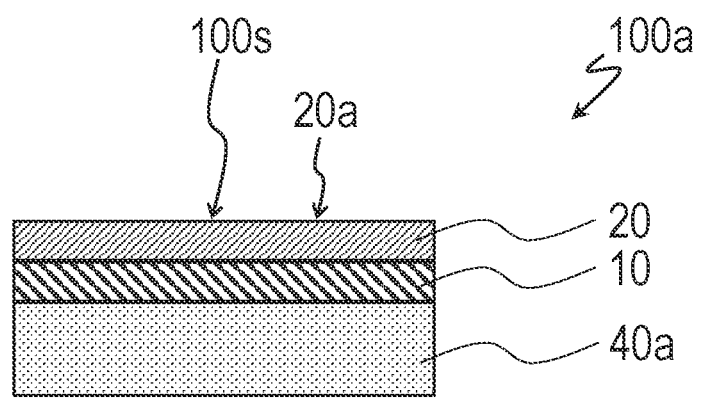
FIG. 1B A schematic cross-sectional view of a whiteboard 100a according to an embodiment of the present invention.

FIG. 1B shows a schematic cross-sectional view of a whiteboard 100a according to an embodiment of the present invention. The whiteboard 100a includes: a diffuse reflection plate 40a to diffuse-reflect visible light; an absorptive polarizing layer 20; and a reflective polarizing layer 10 disposed between the diffuse reflection plate 40a and the absorptive polarizing layer 20. The first transmission axis of the absorptive polarizing layer 20 and the second transmission axis of the reflective polarizing layer 10 are disposed so as to be substantially parallel. Although the whiteboard film 100 will be mainly described below, the whiteboard 100a also attains effects similar to those of the whiteboard film 100. In other words, the whiteboard 100a provides an improved efficiency of light utilization because of including the reflective polarizing layer 10 between the diffuse reflection plate 40a and the absorptive polarizing layer 20. The whiteboard 100a allows the visibility of displayed information to be improved.

The whiteboard film 100 is configured so that text characters, symbols, diagrams, etc., can be drawn on its surface 100s by using an ink containing a pigment or a dyestuff (typically, a pigment), for example. Herein, the whiteboard film 100 can be used as a whiteboard that allows text characters or the like to be written on or erased from its surface 100s. For example, a protection layer (e.g., glass) may further be provided on a surface 20a of the absorptive polarizing layer 20. Alternatively, on the surface 20a of the absorptive polarizing layer 20, an anti-soiling layer made of a fluorine-containing resin or a silicone-containing resin may further be provided. By using an ink that is appropriately adjusted with a solvent, a resin, a release agent, or the like, text characters or the like drawn on the surface 100s can be easily erased through physical rubbing with an eraser (i.e., thus being capable of being written or erased). The surface 100s of the whiteboard film 100 may be just flat enough to allow text characters or the like to be written or erased. In the illustrated case, the surface 100s of the whiteboard film 100 is the surface 20a of the absorptive polarizing layer 20; in the case where the aforementioned protection layer or anti-soiling layer is provided, the surface 100s of the whiteboard film 100 is the surface of the protection layer or anti-soiling layer.

Information that is displayed on the whiteboard film 100, i.e., information such as text characters, symbols, diagrams, etc., drawn with ink on the surface 100s of the whiteboard film 100, is presented to the viewer in the following manner. Within the external light or illumination light (unpolarized light) that is incident on the whiteboard film 100, the polarized light which is parallel to the first transmission axis of the absorptive polarizing layer 20 and the second transmission axis of the reflective polarizing layer 10 is transmitted through the absorptive polarizing layer 20 and the reflective polarizing layer 10, and diffuse-reflected at the surface and/or the interior of the diffuse reflection layer 40. Within the light that is diffuse-reflected by the diffuse reflection layer 40, the polarized light which is parallel to the first transmission axis of the absorptive polarizing layer 20 and the second transmission axis of the reflective polarizing layer 10 is consecutively transmitted through the reflective polarizing layer 10 and the absorptive polarizing layer 20, so as to reach the viewer. When nothing is drawn on the surface 100s, the whiteboard film 100 appears white; when text characters or the like are drawn with ink on the surface 100s, light of a specific wavelength is absorbed by the ink (pigment), so that information such as text characters, symbols, diagrams, etc., drawn on the surface 100s of the whiteboard film 100 are presented to the viewer. Within the light that is diffuse-reflected by the diffuse reflection layer 40, the polarized light which is orthogonal to the second transmission axis of the reflective polarizing layer 10 is reflected by the reflective polarizing layer 10, so as to be again incident on and diffuse-reflected by the diffuse reflection layer 40, whereby its degree of polarization is lowered (depolarized). Within the light that is diffuse-reflected by the diffuse reflection layer 40, the polarized light which is parallel to the first transmission axis of the absorptive polarizing layer 20 and the second transmission axis of the reflective polarizing layer 10 is transmitted through the reflective polarizing layer 10 and the absorptive polarizing layer 20, while the polarized light which is orthogonal to the second transmission axis of the reflective polarizing layer 10 is reflected by the reflective polarizing layer 10 so as to be again incident on and diffuse-reflected by the diffuse reflection layer 40, and this process is repeated; as a result, an improved efficiency of light utilization is provided. Because the whiteboard film 100 can provide an improved white luminance, the visibility of displayed information can be improved.

Because the whiteboard film 100 includes the absorptive polarizing layer 20 at the front surface, it also has an advantage in that the influence of external light reflection can be reduced.

The whiteboard film 100 can also be used as a projector screen. When an image is projected onto the whiteboard film 100 by using a projector, information that is displayed on the whiteboard film 100, i.e., an image that is projected on the whiteboard film 100, can be presented to viewer as follows. Within the light that is emitted from the projector, the polarized light which is parallel to the first transmission axis of the absorptive polarizing layer 20 and the second transmission axis of the reflective polarizing layer 10 is transmitted through the absorptive polarizing layer 20 and the reflective polarizing layer 10, and diffuse-reflected by the diffuse reflection layer 40. Within the light that is diffuse-reflected by the diffuse reflection layer 40, the polarized light which is parallel to the first transmission axis of the absorptive polarizing layer 20 and the second transmission axis of the reflective polarizing layer 10 is consecutively transmitted through the reflective polarizing layer 10 and the absorptive polarizing layer 20 to reach the viewer, whereby the image projected on the whiteboard film 100 is presented to the viewer. Within the light that is diffuse-reflected by the diffuse reflection layer 40, the polarized light which is parallel to the first transmission axis of the absorptive polarizing layer 20 and the second transmission axis of the reflective polarizing layer 10 is transmitted through the reflective polarizing layer 10 and the absorptive polarizing layer 20, while the polarized light which is orthogonal to the second transmission axis of the reflective polarizing layer 10 is reflected by the reflective polarizing layer 10 so as to be again incident on and diffuse-reflected by the diffuse reflection layer 40, and this process is repeated; as a result, an improved efficiency of light utilization is provided. In the case where the whiteboard film 100 is used as a projector screen, too, inclusion of the reflective polarizing layer 10 allows the utilization efficiency of light that is emitted from the projector to be improved. The whiteboard film 100 allows the visibility of displayed information to be improved.

Using the whiteboard film 100 as a projector screen allows the utilization efficiency of light that is emitted from the projector to be improved, and thus there is little need to use a high-luminance projector in order to secure visibility of displayed information. Moreover, because specular reflection at the surface of the diffuse reflection layer 40 is suppressed, there is also provided an advantage in that local brightening of a portion(s) of the projector screen due to specular reflection (hot spot(s)) is suppressed.

In the case where the whiteboard film 100 is used as a projector screen, an anti-reflection layer disposed on the surface 20*a* of the absorptive polarizing layer 20 may further be provided. By including an anti-reflection layer at the topmost surface, specular reflection at the surface 100*s* of the whiteboard film 100 is suppressed, whereby occurrence of hot spots is further reduced.

For example, Japanese Patent No. 2958558 and Japanese Laid-Open Patent Publication No. H08-142581 disclose a projector screen structured so that a diffusion layer, an absorptive polarizing layer, and a specular reflection layer (aluminum layer) are disposed in this order from the viewer's side. Unlike the projector screens disclosed in these publications, the whiteboard film 100 includes a diffuse reflection layer 40 instead of a specular reflection layer, thus having an advantage in that no diffusion layer is needed at the viewer's side. Polarized light that is transmitted through the diffusion layer becomes depolarized. Therefore, as in a peeking prevention system described below with reference to FIG. 2, from the standpoint of utilizing polarized light in order to obscure the information that is displayed on the whiteboard film 100 from a person who is outside the space in which the whiteboard film 100 is disposed, it is preferable that the whiteboard film 100 does not include a diffusion layer at the viewer's side of the absorptive polarizing layer 20 (i.e., at the opposite side of the absorptive polarizing layer 20 from the reflective polarizing layer 10).

The whiteboard film 100 may include adhesion layers, each between the diffuse reflection layer 40 and the reflective polarizing layer 10 and between the reflective polarizing layer 10 and the absorptive polarizing layer 20 independently.

Figure 2:
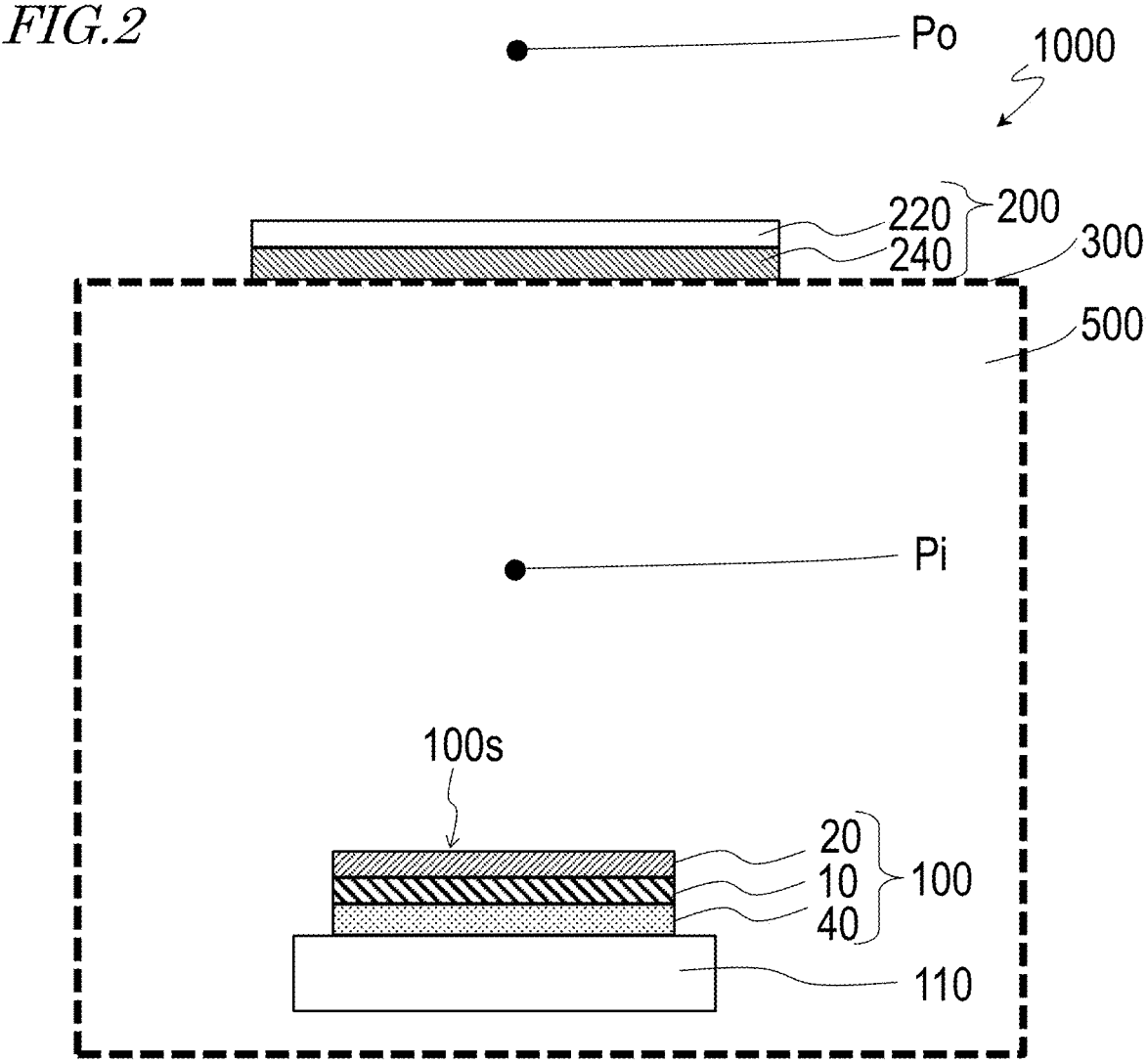
FIG. 2 A diagram schematically showing a peeking prevention system 1000 that includes the whiteboard film 100.

FIG. 2 is a diagram schematically showing a peeking prevention system 1000 that includes the whiteboard film 100, as viewed from above. As shown in FIG. 2, the peeking prevention system 1000 includes: a whiteboard film 100; and a partition 300 to delimit from the surroundings a space 500 in which information displayed on the whiteboard film 100 is to be displayed, the partition 300 having a light-transmitting portion 200 through which the inside of the space 500 is viewable. The light-transmitting portion 200 includes: a transparent substrate 220; and a polarizing layer 240 having a third transmission axis which is orthogonal to the first direction. "Information displayed on the whiteboard film 100" may be, for example, text characters, symbols, diagrams, etc., drawn on the surface 100*s* of the whiteboard film 100 with ink, or, alternatively, an image projected onto the whiteboard film 100 by using a projector. In this example, the whiteboard film 100 is attached to a base 110. The base 110 supports the whiteboard film 100 so that the surface 100*s* of the whiteboard film 100 is essentially parallel to the vertical direction, for example. In the case where the whiteboard film 100 is to be used as a projector screen, the peeking prevention system 1000 includes a projector which is provided inside the space 500 to emit light toward the surface 100*s* of the whiteboard film 100.

As described above, within the light that is diffuse-reflected by the diffuse reflection layer 40, polarized light which is parallel to the transmission axis of light and transmitted through the absorptive polarizing layer 20 (i.e., polarized light parallel to the first direction) reaches a viewer Pi in the space 500, whereby information displayed on the whiteboard film 100 is presented to the viewer Pi in the space 500. Because polarized light which is parallel to the first direction cannot be transmitted through the polarizing layer 240 having the third transmission axis which is orthogonal to the first direction, the person Po who is outside the space 500 cannot see the information displayed on the whiteboard film 100. In general, the degree of polarization of the reflective polarizing layer 10 is lower than the degree of polarization of the absorptive polarizing layer 20; therefore, inclusion of the absorptive polarizing layer 20 in addition to the reflective polarizing layer 10 provides better obscuring of the information displayed on the whiteboard film 100 for the person Po who is outside the space 500 (blinding).

Note that, even when the angle made by the transmission axis of the absorptive polarizing layer 20 and the transmission axis of the polarizing layer 420 is not 90°, so long as the margin of error is within ±10° of 90°, information displayed on the whiteboard film 100 can be made substantially unviewable when the person Po who is outside the space 500 looks at the whiteboard film 100 through the polarizing layer 420 of the light-transmitting portion 200.

Figure 6:
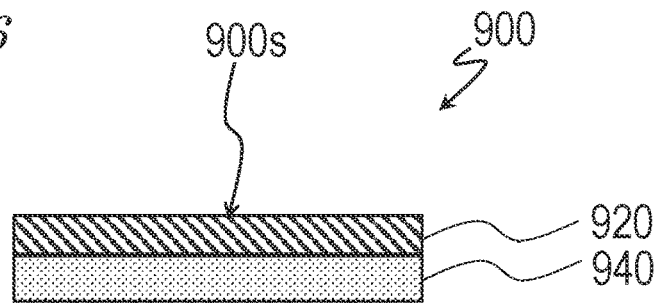
FIG. 6 A schematic cross-sectional view of a whiteboard film 900 according to Comparative Example.

FIG. 6 shows a schematic cross-sectional view of a whiteboard film 900 according to Comparative Example.

The whiteboard film 900 according to Comparative Example includes: a diffuse reflection layer 940 to diffuse-reflect visible light; and an absorptive polarizing layer 920. The whiteboard film 900 according to Comparative Example differs from the whiteboard film 100 according to an embodiment of the present invention in that it includes no reflective polarizing layer.

Information that is displayed the whiteboard film 900 according to Comparative Example, i.e., information such as text characters, symbols, diagrams, etc., drawn with ink on a surface 900*s* of the whiteboard film 900, is presented to the viewer in the following manner. Within the external light or illumination light (unpolarized light) that is incident on the whiteboard film 900, polarized light which is parallel to the transmission axis of the absorptive polarizing layer 920 is transmitted through the absorptive polarizing layer 920, and diffuse-reflected at the surface and/or the interior of the diffuse reflection layer 940. Within the light that is diffuse-reflected by the diffuse reflection layer 940, polarized light which is transmitted through the absorptive polarizing layer 920 (i.e., polarized light which is parallel to the transmission axis of the absorptive polarizing layer 920) has its light of a specific wavelength absorbed by ink (pigment), e.g., text characters drawn on the surface 900*s*, and thereafter reaches the viewer. Thus, information such as text characters, symbols, diagrams, etc., drawn on the surface 900*s* are presented to the viewer. Within the light that is diffuse-reflected by the diffuse reflection layer 940, polarized light which is orthogonal to the transmission axis of the absorptive polarizing layer 920 is absorbed by the absorptive polarizing layer 920, and therefore does not reach the viewer. The whiteboard film 900 according to Comparative Example has a low efficiency of light utilization.

Figure 3:
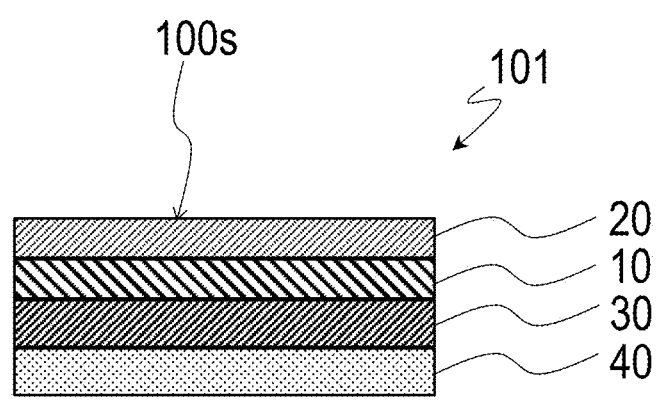
FIG. 3 A schematic cross-sectional view of a whiteboard film 101 according to another embodiment of the present invention.

FIG. 3 shows a schematic cross-sectional view of a whiteboard film 101 according to another embodiment of the present invention.

As shown in FIG. 3, the whiteboard film 101 differs from the whiteboard film 100 in that a low-refractive index layer 30 disposed between the diffuse reflection layer 40 and the reflective polarizing layer 10 is further provided. Differences from the whiteboard film 100 will mainly be described.

The low-refractive index layer 30 has a smaller refractive index than that of the diffuse reflection layer 40. The low-refractive index layer 30, which is transparent with respect to visible light, is made of a light-transmitting material. The refractive index of the low-refractive index layer 30 is preferably 1.30 or less, for example. The low-refractive index layer 30 may be an air layer. Alternatively, the low-refractive index layer 30 may be a porous layer described later. The low-refractive index layer 30 may be made of an adhesive (e.g., an adhesive having a refractive index of not less than 1.4 and not more than 1.6).

As will be described below, because of including the low-refractive index layer 30, the whiteboard film 101 allows the utilization efficiency of light that is diffuse-reflected inside the diffuse reflection layer 40 to be improved; as a result, a further improved efficiency of light utilization is provided over the whiteboard film 100.

Figure 4:
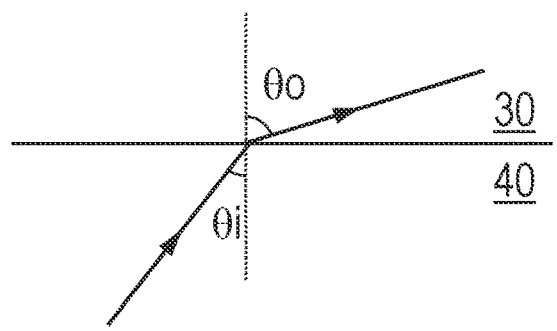
FIG. 4 A cross-sectional view schematically showing a ray trajectory at an interface between a diffuse reflection layer 40 and a low-refractive index layer 30.

Because the refractive index of the low-refractive index layer 30 is smaller than the refractive index of the diffuse reflection layer 40, within the light that is diffuse-reflect inside the diffuse reflection layer 40, light which is incident on the low-refractive index layer 30 at an angle which is equal to the critical angle or greater undergoes total reflection (total internal reflection) at the interface between the diffuse reflection layer 40 and the low-refractive index layer 30. A portion of light having an incident angle θi which is smaller than the critical angle enters the low-refractive index layer 30. Within the light that enters the low-refractive index layer 30, light having a large outgoing angle θo from the diffuse reflection layer 40 to the low-refractive index layer 30, e.g., as shown in FIG. 4, may leak at the end of the low-refractive index layer 30, possibly resulting in a loss of light. When the critical angle is small, a large portion of light undergoes total reflection, whereby the aforementioned loss of light can be suppressed. From the standpoint of improving the efficiency of light utilization, the critical angle is preferably small; therefore, a ratio nl/nr of the refractive index nl of the low-refractive index layer 30 to the refractive index nr of the diffuse reflection layer 40 is preferably small. For example, in the case where the diffuse reflection layer 40 is made of polyvinyl chloride (nr=1.56) and the low-refractive index layer 30 is made of an acrylic adhesive (nl=1.48), nl/nr=0.949, and the critical angle is 72°. For the same diffuse reflection layer 40 (nr=1.56), if the low-refractive index layer 30 is an air layer (nl=1.00), then nl/nr=0.641, and the critical angle is 40°.

In the illustrated example, the low-refractive index layer 30 is directly formed on the surface of the reflective polarizing layer 10; that is, the low-refractive index layer 30 is directly in contact with the reflective polarizing layer 10. Without being limited to this example, a whiteboard film according to an embodiment of the present invention may include a further layer that is transparent with respect to visible light (e.g., an acrylic resin or PET film) between the low-refractive index layer 30 and the reflective polarizing layer 10.

Similarly to the whiteboard film 100, by including the reflective polarizing layer 10 between the diffuse reflection layer 40 and the absorptive polarizing layer 20, the whiteboard film 101 provides an improved efficiency of light utilization. The whiteboard film 101 allows the visibility of displayed information to be improved.

Instead of using the whiteboard film 100 in the peeking prevention system 1000, the whiteboard film 101 may be used, whereby information displayed on the whiteboard film 101 can be made invisible from outside of the space 500.

B. Absorptive Polarizing Layer

The absorptive polarizing layer (which hereinafter may simply be referred to as a polarizer) is, typically, a resin film having a dichroic substance (e.g., iodine) adsorbed thereon and being given an orientation. For example, the absorptive polarizing layer may be a single-layered resin film, or a stack of two or more layers of resin film.

Specific examples of absorptive polarizing layers composed of a single-layered resin film include: a hydrophilic polymer film, e.g., a polyvinyl alcohol (PVA)-based film, a partially formalated PVA-based film, or an ethylene vinyl acetate copolymer-based partially saponified film, such hydrophilic polymer films having been subjected to dyeing treatment with iodine, dichroic dyes, or other dichroic substances as well as drawing; polyene-based oriented films, e.g., dehydrated PVA and dechlorinated polyvinyl chloride; and so on. Preferably, an absorptive polarizing layer which is obtained by dyeing a PVA-based film with iodine and uniaxially drawing it is used because of its superior optical characteristics.

The aforementioned dyeing with iodine is performed, for example, by immersing the PVA-based film in an aqueous solution of iodine. The stretching ratio of the aforementioned uniaxial drawing is preferably not less than 3 times and not more than 7 times. Drawing may be done after dyeing treatment or while dyeing. Alternatively, dyeing may take place after drawing. If necessary, PVA-based films are subjected to swelling treatment, cross-linking treatment, washing treatment, drying treatment, and the like. For example, before dyeing, the PVA-based film may be immersed in water and rinsed to clean the PVA-based film surface of dirt and any blocking inhibitor, and also to allow the PVA-based film to swell in order to prevent uneven dyeing and the like.

Specific examples of an absorptive polarizing layer obtained by using a stack are absorptive polarizing layers obtained by using a stack of a resin base and a PVA-based resin layer (PVA-based resin film) that is layered on the resin base, or a stack of a resin base and a PVA-based resin layer applied on the resin base. An absorptive polarizing layer that is obtained by using a stack of a resin base and a PVA-based resin layer applied on the resin base can be formed by, for example: applying a PVA-based resin solution on a resin base, and drying it to form a PVA-based resin layer on the resin base, thereby obtaining a stack consisting of the resin base and the PVA-based resin layer; and drawing and dyeing the stack so that the PVA-based resin layer becomes a polarizer. In the present embodiment, typically, drawing involves immersing a stack in an aqueous boric acid solution and drawing it. Furthermore, as necessary, drawing may further involve drawing a stack in air at a high temperature (e.g., 95° C. or above) before drawing it in the aqueous boric acid solution. The resultant resin base/polarizer stack may be used as it is (i.e., the resin base may be used as a protection layer for the polarizer), or the resin base may be peeled off the resin base/polarizer stack, and any appropriate protection layer suited for the purpose may be layered on the peeled surface. Details of such a method of producing a polarizer are described in Japanese Laid-Open Patent Publication No.

2012-73580, for example. The entire disclosure of this publication is incorporated herein by reference.

The absorptive polarizing layer preferably exhibits an absorption dichroism at a wavelength from 380 nm to 780 nm. The absorptive polarizing layer has a single transmittance of preferably not less than 42.0% and not more than 46.0%, and more preferably not less than 42.5% and not more than 45.0%. The absorptive polarizing layer has a degree of polarization of preferably 97.0% or more, more preferably 99.0% or more, and even more preferably 99.9% or more.

The absorptive polarizing layer may have a thickness of e.g. not less than 1 µm and not more than 80 µm. The thickness of the absorptive polarizing layer is preferably not less than 1 µm and not more than 30 µm, more preferably not less than 3 µm and not more than 20 µm, and even more preferably not less than 5 µm and not more than 18 µm.

C. Reflective Polarizing Layer

The reflective polarizing layer includes a reflective polarizer that functions to transmit polarized light in a direction that is parallel to the transmission axis and to reflect polarized light that is orthogonal to the transmission axis. The reflective polarizer may be of a linear polarization separation type, or of a circular polarization separation type. Hereinafter, as an example, a reflective polarizer of a linear polarization separation type will be briefly described. Note that a reflective polarizer of a circular polarization separation type may be exemplified by a stack of a film on which cholesteric liquid crystal is immobilized and a λ/4 plate.

Figure 5:
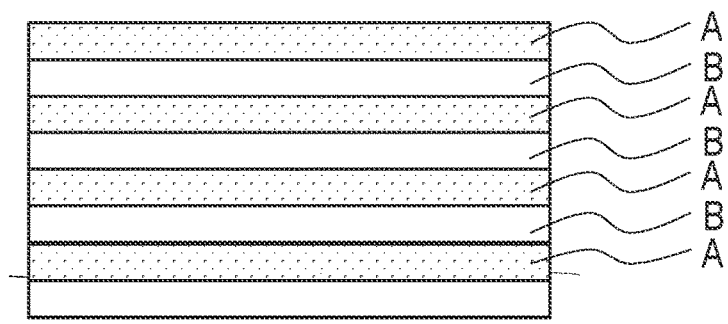
FIG. 5 A schematic cross-sectional view showing an example structure of a reflective polarizing layer 10.
Figure 5:
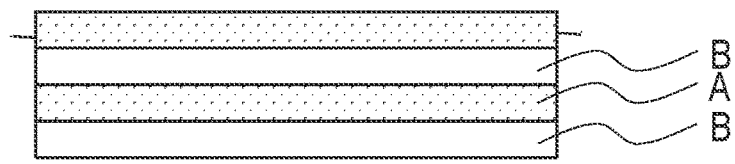
Figure 5:
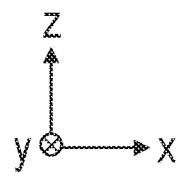

FIG. 5 is a cross-sectional view schematically showing an example structure of the reflective polarizing layer 10. The reflective polarizing layer 10 includes a reflective polarizer, as a multilayer stack in which layers A having birefringence and layers B having substantially no birefringence are alternately layered along the z axis direction. The total number of layers in such a multilayer stack may be not less than 50 and not more than 1000, for example. For example, an A layer has a refractive index nx along the x axis direction that is greater than a refractive index ny along the y axis direction, whereas a B layer has a refractive index nx along the x axis direction and a refractive index ny along the y axis direction that are substantially equal. Therefore, the difference in refractive index between an A layer and a B layer is large along the x axis direction, but substantially zero along the y axis direction. As a result of this, the x axis direction serves as a reflection axis (which is perpendicular to the transmission axis), whereas the y axis direction serves as a transmission axis. The difference in refractive index between an A layer and a B layer along the x axis direction is preferably not less than 0.2 and not more than 0.3. Note that the x axis direction corresponds to the drawing direction of a reflective polarizer in the production method for the reflective polarizer.

The A layers are preferably made of a material that exhibits birefringence after being drawn. Representative examples of such materials include naphthalene dicarboxylic acid polyesters (e.g., polyethylene naphthalate), polycarbonates, and acrylic resins (e.g., polymethyl methacrylate). Polyethylene naphthalate is preferable. The B layers are preferably made of a material that substantially does not exhibit birefringence even when drawn. A representative example of such a material is a copolyester of naphthalene dicarboxylic acid and terephthalic acid.

As the reflective polarizer, those described in Japanese National Phase PCT Laid-Open Publication No. H09-507308 may be used, for example. As the reflective polarizer, commercially available products may be used as they are, or commercially available products may be used after being subjected to secondary processing (e.g., drawing). Commercially available products include, for example, a product named DBEF (DBEF is a registered trademark) manufactured by 3M Co. and a product named APF manufactured by 3M Co.

D. Diffuse Reflection Layer or Diffuse Reflection Plate

The diffuse reflectance (i.e., a sum of surface diffuse reflectance and internal diffuse reflectance) of the diffuse reflection layer or diffuse reflection plate is preferably 80% or more, and more preferably 90% or more, for example. A specular reflection component in the total reflected light when visible light is incident on the diffuse reflection layer or diffuse reflection plate is preferably 50% or less (that is, there is a diffuse reflection component of 50% or more), for example.

The diffuse reflection layer or diffuse reflection plate has a surface with bump/dent features for diffuse-reflecting visible light, for example. Disposing the reflective polarizing layer on the surface of a diffuse reflection layer or diffuse reflection plate having bump/dent features makes it easy to form an air layer (low-refractive index layer) between the diffuse reflection layer or diffuse reflection plate and the reflective polarizing layer, and, even if an air layer is formed, Newton's rings are restrained from occurring. The diffuse reflection layer or diffuse reflection plate may be made of a resin composition containing silica microparticles or other microparticles dispersed in a resin, for example. In this case, however, Newton's rings may occur if an air layer is provided so as to be in contact with the diffuse reflection layer or diffuse reflection plate; therefore, when an air layer is provided as a low-refractive index layer, the diffuse reflection layer or diffuse reflection plate to be used preferably has a surface with bump/dent features to diffuse-reflect visible light. When an adhesive layer that is in contact with the diffuse reflection layer or diffuse reflection plate is provided, preferably the diffuse reflection layer or diffuse reflection plate does not have a surface with bump/dent features; for example, the diffuse reflection layer or diffuse reflection plate is preferably made of a resin composition containing silica microparticles or other microparticles dispersed in a resin. For example, in the case where a low-refractive index layer other than an air layer (e.g., a porous layer) is provided, the low-refractive index layer is attached to the diffuse reflection layer or diffuse reflection plate typically via an adhesive layer.

As the diffuse reflection layer, for example, white matte PET films (e.g., Lumirror E6SR, E22, E6DY, which are polyester films manufactured by Toray Industries, Inc.) (Lumirror is a registered trademark), printing paper for printers (white), screen sheets for projectors, coating on a steel partition that is painted white (resin film containing pigments), etc., can be used.

As the diffuse reflection plate, for example, white matte acrylic resin plates (PMMA) (e.g., COMOGLAS M (bone white) and COMOGLAS DFA2 (both-side matted) white M, manufactured by Kuraray Co., LTD.; Sumipex M067 white matte and Sumipex 068 white, manufactured by Sumitomo Bakelite Co., Ltd.) (COMOGLAS and Sumipex are registered trademarks) can be used.

As a base supporting the diffuse reflection layer, for example, an iron plate or a stainless steel plate (SUS plate) can be used. When a screen sheet for use with projectors that has a magnet thereon is used, it can be directly attached onto a magnetic plate (e.g., SU5403). Without being limited to this, a diffuse reflection layer may be bonded to the base by using an adhesive.

E. Low-Refractive Index Layer

The low-refractive index layer may have a porous structure. The low-refractive index layer may be made of a porous layer. Porous layers suitably used as the low-refractive index layer include silica particles, silica particles with micropores, essentially spherical particles such as silica hollow nanoparticles, fibrous particles such as cellulose nanofibers, alumina nanofibers, silica nanofibers, and flat-plate particles such as nanoclay composed of bentonite. In one embodiment, the porous layer is a porous material composed of particles (e.g., micropored particles) that are chemically bonded directly to one another. The particles composing the porous layer may be at least partially bonded to one another via a small amount (e.g., less than the mass of the particles) of a binder component. The porosity and refractive index of the porous layer can be adjusted based on the particle size, particle size distribution, and the like of the particles composing the porous layer.

Examples of methods of obtaining a porous layer include a method of forming a low-refractive index layer described in International Publication No. 2019/146628, and methods described in Japanese Laid-Open Patent Publication No. 2010-189212, Japanese Laid-Open Patent Publication No. 2008-040171, Japanese Laid-Open Patent Publication No. 2006-011175, International Publication No. 2004/113966, Japanese Laid-Open Patent Publication No. 2017-054111, Japanese Laid-Open Patent Publication No. 2018-123233, and Japanese Laid-Open Patent Publication No. 2018-123299, as well as the references mentioned therein. The entire disclosure of these publications is incorporated herein by reference.

As the porous layer, porous silica can be suitably used. Porous silica can be produced by the following method, for example: a method involving hydrolyzing and polycondensing at least one of silicon compounds, hydrolyzable silanes and/or silsesquioxanes, and their partial hydrolysates and dehydration-condensation products; a method that uses porous particles and/or hollow microparticles; and a method that generates an aerogel layer using the springback phenomenon, a method of pulverizing a gelatinous silicon compound obtained by sol-gel processing and using a pulverized gel in which micropored particles as the resultant pulverized body are chemically bonded to one another with a catalyst or the like; and so on. However, the porous layer is not limited to porous silica, and the production method is not limited to the exemplified production methods; any production method may be used for production. Silsesquioxane is a silicon compound with ($RSiO_{1.5}$; where R is a hydrocarbon group) as the basic structural unit. Although silsesquioxane is not exactly the same as silica, whose basic structural unit is $SiO_2$, it has a network structure cross-linked by siloxane bonds, similarly to silica. Therefore, any porous material that contains silsesquioxane as its basic structural unit is also referred to as porous silica or silica-based porous material.

Porous silica may be composed of micropored particles of a gelatinous silicon compound that are bonded to one another. An example of micropored particles of a gelatinous silicon compound is a pulverized body of the gelatinous silicon compound. Porous silica may be formed by coating a base with a coating solution that contains a pulverized body of a gelatinous silicon compound, for example. The pulverized body of the gelatinous silicon compound may chemically bonded (e.g., siloxane bonded) through catalytic action, light irradiation, heating, or the like, for example.

The lower limit value of the thickness of the porous layer may be any value that is greater than the wavelength of light used, for example. Specifically, the lower limit value may be e.g. 0.3 μm or more. Although the upper limit value of the thickness of the porous layer is not particularly limited, it may be e.g. 5 μm or less, and more preferably 3 μm or less. So long as the thickness of the porous layer is within the above range, the bumps and dents of the surface will not be so large as to affect layering, and therefore it can be easily made into a composite or layered with another member.

The refractive index of the porous layer is preferably 1.30 or less, for example. This makes total internal reflection likely to occur at the interface with the porous layer, i.e., makes the critical angle small. The refractive index of the porous layer is more preferably 1.25 or less, even more preferably 1.18 or less, and particularly preferably 1.15 or less. Although the lower limit of the refractive index of the porous layer is not particularly limited, it is 1.05 or more from the standpoint of mechanical strength.

The lower limit value of the porosity of the porous layer is e.g. 40% or more, preferably 50% or more, more preferably 55% or more, and still more preferably 70% or more. The upper limit value of the porosity of the porous layer is e.g. 90% or less, and more preferably 85% or less. The porosity can be calculated from the refractive index value measured with an ellipsometer, Lorentz-Lorenz's formula, for example.

The film density of the porous layer is e.g. 1 $g/cm^3$ or more, preferably 10 $g/cm^3$ or more, and more preferably 15 $g/cm^3$ or more. On the other hand, the film density is e.g. 50 $g/cm^3$ or less, preferably 40 $g/cm^3$ or less, more preferably 30 $g/cm^3$ or less, and even more preferably 2.1 $g/cm^3$ or less. The range of film density is e.g. not less than 5 $g/cm^3$ and not more than 50 $g/cm^3$, preferably not less than 10 $g/cm^3$ and not more than 40 $g/cm^3$, and more preferably not less than 15 $g/cm^3$ and not more than 30 $g/cm^3$. Alternatively, this range is e.g. not less than 1 $g/cm^3$ and not more than 2.1 $g/cm^3$. Film density may be measured by known methods.

EXAMPLES

Hereinafter, the present invention will be specifically described byway of Examples; however, the present invention is not to be limited by these Examples. The method of evaluation in Examples is as follows. Unless otherwise specified, "part(s)" and "%" in Examples are based on mass.

<Measurement of Reflectance>

The spectrophotometer (UV-Vis-NIR Spectrophotometer V-660 manufactured by Japan Spectroscopic Corporation), to which an integrating sphere unit (ISV-722) had been attached, was used to measure total reflectance and diffuse reflectance. For each of total reflectance and diffuse reflectance, by using a standard white plate of barium sulfate as a reference sample, the ratio of the amount of light reflected by an Example sample to the amount of light reflected by the reference sample (relative reflectance) was determined. The total reflectance and diffuse reflectance were each obtained by measuring the wavelength range from 430 nm to 780 nm at 2 nm intervals and determining a mean value thereof. The specular reflectance was obtained by subtracting the diffuse reflectance from the total reflectance. The specular reflection component was obtained by determining the ratio of the specular reflectance to the total reflectance.

Example 1

1-1. Absorptive Polarizing Layer

A long roll of polyvinyl alcohol (PVA)-based resin film having a thickness of 30 μm (Kuraray Co., Ltd. product name: "PE3000") was uniaxially drawn in the longitudinal direction by a roll drawing machine to become 5.9 times as large along the longitudinal direction while simultaneously undergoing swelling, dyeing, cross-linking, and washing treatment, and finally received drying treatment, whereby a polarizer having a thickness of 12 μm (single transmittance: 45.1%) was obtained. Specifically, this was as follows: The swelling treatment was performed for a 2.2 times stretch, while treating it with pure water at 20° C. Next, the dyeing treatment was carried out in an aqueous solution at 30° C. containing iodine and potassium iodide at a mass ratio of 1:7, the iodine concentration being adjusted so that the resulting polarizer had a single transmittance of 45.0%, thus effecting a 1.4 times stretch. Furthermore, two stages of cross-linking treatment were adopted for the cross-linking treatment. The first stage of cross-linking treatment was performed in an aqueous solution at 40° C. in which boric acid and potassium iodide had been dissolved, for a 1.2 times stretch. The boric acid content in the aqueous solution in the first stage of cross-linking treatment was 5.0 mass % and the potassium iodide content was 3.0 mass %. The second stage of cross-linking treatment was performed in an aqueous solution at 65° C. in which boric acid and potassium iodide had been dissolved, for a 1.6 times stretch. The boric acid content in the aqueous solution in the second stage of cross-linking treatment was 4.3 mass % and the potassium iodide content was 5.0 mass %. The washing treatment was performed with an aqueous solution of potassium iodide at 20° C. The potassium iodide content in the aqueous solution for the washing treatment was 2.6 mass %. Finally, the drying treatment was performed at 70° C. for 5 minutes, whereby a polarizer was provided. Protection films (TAC film; thickness: 25 μm) were attached to both sides of the resulting polarizer, whereby an absorptive polarizing layer was obtained.

1-2. Whiteboard

As the diffuse reflection plate, a white acrylic resin extrusion plate (manufactured by Kuraray Co., LTD.; product name: "COMOGLAS" M (bone white) #3; thickness: 5 mm; refractive index: 1.49) was provided. On one of the principal faces of the diffuse reflection plate, a reflective polarizing layer (manufactured by 3M Co.; product name: APF) and the absorptive polarizing layer obtained as above were attached in this order, whereby a whiteboard according to Example 1 having a similar configuration to that of the whiteboard 100a shown in FIG. 1B was obtained. For the attachment, a transparent tackiness agent (manufactured by Nitto Denko Corporation; product name: LUCIACS CS9862UA; refractive index: 1.49) (LUCIACS is a registered trademark) was used. Reflectance measurements were taken of the whiteboard according to Example 1 by the aforementioned method. The results are shown in Table 1.

Example 2

Except for forming a low-refractive index layer (porous layer, refractive index 1.18) between the reflective polarizing layer and the diffuse reflection plate, the whiteboard according to Example 2 was obtained in a similar manner to Example 1. Reflectance measurements were taken of the whiteboard according to Example 2 by the aforementioned method. The results are shown in Table 1.

The porous layer was produced by the procedure according to [Manufacturing Example 1] to [Manufacturing Example 3] below.

[Manufacturing Example 1] Preparation of Coating Solution for Forming a Low-Refractive Index Layer (1) Gelation of Silicon Compound To 2.2 g of dimethyl sulfoxide (DMSO), 0.95 g of methyltrimethoxysilane (MTMS) as a precursor of the silicon compound was dissolved to prepare Mixture A. To this Mixture A, 0.5 g of 0.01 mol/L oxalic acid aqueous solution was added, and stirred at room temperature for 30 minutes to hydrolyzed the MTMS, thereby producing Mixture B containing tris(hydroxy)methylsilane.

To 5.5 g of DMSO, 0.38 g of 28 mass % ammonia and 0.2 g of pure water were added, after which the aforementioned Mixture B was further added, and stirred at room temperature for 15 minutes, thereby effecting gelation of the tris(hydroxy)methylsilane, whereby Mixture C containing a gelatinous silicon compound was obtained.

(2) Aging Process

Mixed solution C, containing the gelatinous silicon compound as prepared above, was incubated as it was at 40° C. for 20 hours, thereby effecting an aging process.

(3) Pulverization Process

Next, the gelatinous silicon compound that had undergone the aging process as described above was crushed into granules of several millimeters to several centimeters in size, using a spatula. Next, 40 g of isopropyl alcohol (IPA) was added to Mixture C, and this was stirred lightly and allowed to stand at room temperature for 6 hours, thereby decanting the solvent and catalyst in the gel. The same decantation process was performed three times to replace the solvent, whereby Mixture D was obtained. Next, the gelatinous silicon compound in Mixture D was subjected to a pulverization process (high-pressure media-less pulverization). For the pulverization process (high-pressure media-less pulverization), a homogenizer (manufactured by S.M.T.; product name: "UH-50") was used. Into a 5-cc screw bottle, 1.85 g of the gelatinous compound in Mixture D and 1.15 g of IPA were weighed, after which pulverization was performed at 50 W, 20 kHz for 2 minutes.

This pulverization process pulverized the gelatinous silicon compound in the above Mixture D, and thus Mixture D' resulted which was a sol solution of the pulverized material. The volume-averaged particle size, which indicates the grain size variation of the pulverized material in Mixture D', was confirmed using a dynamic light scattering Nanotrac particle size analyzer (manufactured by Nikkiso Co., Ltd.; UPA-EX150) to be 0.50 to 0.70. Furthermore, to 0.75 g of this sol solution (Mixture D'), 0.062 g of a 1.5 mass % concentration MEK (methyl ethyl ketone) solution of a photobase generator (Wako Pure Chemical Industries, Ltd.; product name: WPBG266), and 0.036 g of a 5% concentration MEK solution of bis(trimethoxysilyl) ethane were added, whereby Coating Solution A for forming a low-refractive index layer was obtained.

[Manufacturing Example 2] Preparation of Tackiness Agent

Into a four-necked flask equipped with stirring blades, a thermometer, a nitrogen gas inlet tube, and a cooler, 90.7 parts of butyl acrylate, 6 parts of N-acryloyl morpholine, 3 parts of acrylic acid, 0.3 parts of 2-hydroxybutyl acrylate, and 0.1 mass parts of 2,2'-azobisisobutyronitrile as a polymerization initiator were placed, together with 100 g of ethyl acetate. After nitrogen replacement by introducing nitrogen gas with gentle stirring, the liquid temperature in the flask was kept at around 55° C. and a polymerization reaction was carried out for 8 hours, thereby preparing an acrylic polymer solution. To 100 parts in solid content of the resulting acrylic polymer solution, 0.2 parts of an isocyanate cross-linking agent (Coronate L from Nippon Polyurethane Industry Co., Ltd.; 0.2 parts of a tolylene diisocyanate adduct of trimethylolpropane), 0.3 parts of benzoyl peroxide (NYPER BMT, manufactured by Nippon Oil & Fats Co., Ltd. 3 parts, and 0.2 parts of γ-glycidoxypropyl methoxysilane (manufactured by Shin-Etsu Chemical Co., Ltd.: KBM-403) were blended, thereby preparing an acrylic tackiness agent solution. Then, the above acrylic tackiness agent solution was applied to one side of a silicone-treated polyethylene terephthalate (PET) film (manufactured by Mitsubishi Polyester Film Corporation; thickness: 38 μm)) so that the thickness of the tackiness agent layer after drying was a predetermined thickness; and this was dried at 150° C. for 3 minutes, thereby producing a tackiness agent layer.

[Manufacturing Example 3] Production of a Stack with Tackiness Agent Layers on Both Sides A base (acrylic film) having a thickness of 30 μm was coated with Coating Solution A for forming a low-refractive index layer, as prepared in Manufacturing Example 1. The wet thickness (i.e., thickness before drying) of the coating layer was about 27 μm. The coating layer was treated at a temperature of 100° C. for 1 minute for drying, whereby a low-refractive index layer (thickness: 0.9 μm) was formed upon the base. The resultant low-refractive index layer had a refractive index of 1.18. Next, tackiness agent layers as prepared in Manufacturing Example 2 (the tackiness agent layer on the low-refractive index layer side having a thickness of 10 μm, the tackiness agent layer on the base side having a thickness of 75 μm) were disposed on both sides of the base/low-refractive index layer stack, thus producing a stack with tackiness agent layers on both sides.

Example 3

As the diffuse reflection plate, a white acrylic resin extrusion plate (manufactured by Kuraray Co., LTD.; product name: "COMOGLAS" DFA2 (both-side matted) white, M, #3; thickness: 5 mm) was used. An absorptive polarizing layer and a reflective polarizing layer were provided in similar manners to Example 1, and the absorptive polarizing layer and the reflective polarizing layer were attached together by using a transparent adhesive, and the attached stack was placed on the diffuse reflection layer (white acrylic resin extrusion plate), whereby a whiteboard according to Example 3 was obtained. The whiteboard according to Example 3 included an air layer (refractive index 1.0) formed between the reflective polarizing layer and the diffuse reflection plate. Reflectance measurements were taken of the whiteboard according to Example 3 by the aforementioned method. The results are shown in Table 1.

Comparative Example 1

Except for not forming a reflective polarizing layer, a whiteboard according to Comparative Example 1 was obtained similarly to Example 1. Reflectance measurements were taken of the whiteboard according to Comparative Example 1 by the aforementioned method. The results are shown in Table 1.

Reference Example

A configuration consisting only of the white acrylic resin extrusion plate used in Example 1 was designated as the whiteboard according to Reference Example. Reflectance measurements were taken of the whiteboard according to Reference Example by the aforementioned method. The results are shown in Table 1.

TABLE 1

| | Reference Example | Comparative Example 1 | Example 1 | Example 2 | Example 3 |
|---|---|---|---|---|---|
| diffuse reflection plate | white acrylic resin plate | white acrylic resin plate | white acrylic resin plate | white acrylic resin plate | white acrylic resin plate |
| layer between diffuse reflection plate and reflective polarizing layer (refractive index) | — | adhesion layer (1.49) | adhesion layer (1.49) | porous layer (1.18) | air layer (1.0) |
| reflective polarizing layer | — | — | ○ | ○ | ○ |
| absorptive polarizing layer | — | ○ | ○ | ○ | ○ |
| total reflectance rr + rd [%] | 86.0 | 15.4 | 23.0 | 28.3 | 35.4 |
| specular reflectance rr [%] | 2.6 | 5.2 | 7.3 | 8.8 | 10.9 |
| diffuse reflectance rd [%] | 83.4 | 10.2 | 15.6 | 19.5 | 24.5 |
| specular reflection component rr/(rr + rd) | 3% | 34% | 32% | 31% | 31% |

It can be seen that the whiteboards according to Examples 1 to 3 had high total reflectance and diffuse reflectance as compared to the whiteboard according to Comparative Example 1, indicative of an improved efficiency of light utilization. Also, the whiteboards according to Examples 1 to 3 were improved in terms of visibility of displayed information as compared to the whiteboard according to Comparative Example 1. The whiteboard according to Comparative Example 1 (total reflectance: 15%, diffuse reflectance 10%) did not have sufficient white luminance, so that text characters written on its surface with a black marker did not show sufficient visibility. On the other hand, the whiteboards according to Examples 1 to 3 (total reflectance: 20% or more, diffuse reflectance: 15% or more) had high white luminance as compared to the whiteboard according to Comparative Example 1, and it was confirmed that text characters written on their surface with a black marker had high visibility. It is considered that, because of having high total reflectance and diffuse reflectance as compared to the whiteboard according to Comparative Example 1, the whiteboards according to Examples 1 to 3 had an improved efficiency of light utilization and good visibility of displayed information. Among the whiteboards according to Examples 1 to 3, the whiteboard according to Examples 2 and 3 whose low-refractive index layer had a refractive index of 1.18 or less had higher total reflectance and diffuse reflectance values than those of the whiteboard according to Example 1, thus having an improved efficiency of light utilization and visibility of displayed information.

As the diffuse reflection plate, other than those used in Examples, a cast acrylic board manufactured by Sumitomo Bakelite Co., Ltd. (product name: Sumipex M067 white matte, Sumipex 068 white) or the like can be used. Instead of the white acrylic resin extrusion plates manufactured by Kuraray Co., LTD. that were used in Examples, the inventors also tried similar evaluations by using a cast acrylic board manufactured by Sumitomo Bakelite Co., Ltd. (product name: Sumipex M067 white matte, Sumipex 068 white), which did not show major deviations from the results of Examples.

INDUSTRIAL APPLICABILITY

A whiteboard film and whiteboard according to an embodiment of the present invention allows the visibility of displayed information to be improved. A whiteboard film and whiteboard according to an embodiment of the present invention is suitably used as a whiteboard or a projector screen.

REFERENCE SIGNS LIST 10 reflective polarizing layer
20 absorptive polarizing layer
30 low-refractive index layer
40 diffuse reflection layer
40a diffuse reflection plate
100 whiteboard film
100a whiteboard
101 whiteboard film
1000 peeking prevention system

The invention claimed is:

1. A whiteboard film comprising:
a diffuse reflection layer to diffuse-reflect visible light;
an absorptive polarizing layer having a first transmission axis that is parallel to a first direction; and
a reflective polarizing layer being disposed between the diffuse reflection layer and the absorptive polarizing layer and having a second transmission axis that is substantially parallel to the first direction, the absorptive polarizing layer being disposed directly on or adhered to the reflective polarizing layer.

2. The whiteboard film of claim 1, further comprising a low-refractive index layer being disposed between the diffuse reflection layer and the reflective polarizing layer and having a refractive index that is smaller than a refractive index of the diffuse reflection layer.

3. The whiteboard film of claim 2, wherein the refractive index of the low-refractive index layer is 1.30 or less.

4. The whiteboard film of claim 2, wherein the low-refractive index layer is an air layer.

5. A peeking prevention system comprising:
the whiteboard film of claim 1; and
a partition to delimit from the surroundings a space in which information displayed on the whiteboard film is presented, the partition having a light-transmitting portion through which the inside of the space is viewable, wherein
the light-transmitting portion includes a transparent substrate and a polarizing layer, the polarizing layer having a third transmission axis that is orthogonal to the first direction.

6. A whiteboard comprising:
a diffuse reflection plate to diffuse-reflect visible light;
an absorptive polarizing layer having a first transmission axis that is parallel to a first direction; and
a reflective polarizing layer being disposed between the diffuse reflection plate and the absorptive polarizing layer and having a second transmission axis that is substantially parallel to the first direction, the absorptive polarizing layer being disposed directly on or adhered to the reflective polarizing layer.

7. The whiteboard of claim 6, further comprising a low-refractive index layer being disposed between the diffuse reflection plate and the reflective polarizing layer and having a refractive index that is smaller than a refractive index of the diffuse reflection plate.

8. The whiteboard of claim 7, wherein the refractive index of the low-refractive index layer is 1.30 or less.

9. The whiteboard of claim 7, wherein the low-refractive index layer is an air layer.

10. A peeking prevention system comprising:
the whiteboard of claim 6; and
a partition to delimit from the surroundings a space in which information displayed on the whiteboard is presented, the partition having a light-transmitting portion through which the inside of the space is viewable, wherein
the light-transmitting portion includes a transparent substrate and a polarizing layer, the polarizing layer having a third transmission axis that is orthogonal to the first direction.

* * * * *